(12) United States Patent
Durham et al.

(10) Patent No.: US 8,826,035 B2
(45) Date of Patent: Sep. 2, 2014

(54) CUMULATIVE INTEGRITY CHECK VALUE (ICV) PROCESSOR BASED MEMORY CONTENT PROTECTION

(75) Inventors: David Durham, Beaverton, OR (US); Men Long, Hillsboro, OR (US); Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1195 days.

(21) Appl. No.: 12/646,028

(22) Filed: Dec. 23, 2009

(65) Prior Publication Data

US 2011/0154059 A1  Jun. 23, 2011

(51) Int. Cl.
*G06F 21/00* (2013.01)

(52) U.S. Cl.
USPC ........... 713/189; 713/161; 713/165; 713/193; 726/2; 726/26; 726/30; 380/277

(58) Field of Classification Search
USPC ................ 713/165, 189; 726/22, 26; 380/277
See application file for complete search history.

(56) References Cited

U.S. PATENT DOCUMENTS

| | | | | |
|---|---|---|---|---|
| 6,986,057 | B1 * | 1/2006 | Cusey et al. | 713/161 |
| 7,124,317 | B2 * | 10/2006 | Yoshino et al. | 714/6.12 |
| 8,200,961 | B2 * | 6/2012 | Srinivasan et al. | 713/161 |
| 8,356,178 | B2 * | 1/2013 | Hars | 713/170 |
| 8,527,978 | B1 * | 9/2013 | Sallam | 717/168 |
| 2002/0116662 | A1 * | 8/2002 | Hofstee et al. | 714/25 |
| 2004/0055001 | A1 * | 3/2004 | Islam | 718/106 |
| 2004/0111608 | A1 * | 6/2004 | Oom Temudo de Castro et al. | 713/156 |
| 2004/0215960 | A1 * | 10/2004 | Wakao et al. | 713/161 |
| 2007/0033467 | A1 * | 2/2007 | Bancel et al. | 714/732 |
| 2007/0050693 | A1 * | 3/2007 | Kiryu | 714/733 |
| 2008/0028204 | A1 * | 1/2008 | Masuhiro et al. | 713/152 |
| 2008/0276088 | A1 * | 11/2008 | Ahlquist | 713/168 |
| 2009/0019288 | A1 * | 1/2009 | Oom Temudo de Castro et al. | 713/181 |
| 2009/0055656 | A1 * | 2/2009 | Mersh | 713/187 |
| 2009/0070885 | A1 * | 3/2009 | Mersh | 726/27 |
| 2009/0254788 | A1 * | 10/2009 | Cervantes et al. | 714/733 |
| 2010/0031058 | A1 * | 2/2010 | Kito et al. | 713/193 |
| 2010/0042832 | A1 * | 2/2010 | Fujibayashi et al. | 713/165 |
| 2010/0082997 | A1 * | 4/2010 | Elbaum et al. | 713/180 |

OTHER PUBLICATIONS

Guimaraes et al, Evaluation of Security Mechanisms in Wireless Sensor Networks, Feb. 2005, IEEE, pp. 1-6.*
Wang et al, A Simple Authentication and Key Distribution Protocol in Wireless Mobile Networks, May 2007, IEEE, pp. 2282-2285.*

* cited by examiner

*Primary Examiner* — Bradley Holder
*Assistant Examiner* — Jenise Jackson
(74) *Attorney, Agent, or Firm* — Ryder, Lu, Mazzeo and Konieczny, LLC

(57) ABSTRACT

In general, in one aspect, the disclosure describes a process that includes a cryptographic engine and first and second registers. The cryptographic engine is to encrypt data to be written to memory, to decrypt data read from memory, to generate read integrity check values (ICVs) and write ICVs for memory accesses. The cryptographic engine is also to create a cumulative read ICV and a cumulative write ICV by XORing the generated read ICV and the generated write ICV with a current read MAC and a current write ICV respectively and to validate data integrity by comparing the cumulative read ICV and the cumulative write ICV. The first and second registers are to store the cumulative read and write ICVs respectively at the processor. Other embodiments are described and claimed.

20 Claims, 10 Drawing Sheets

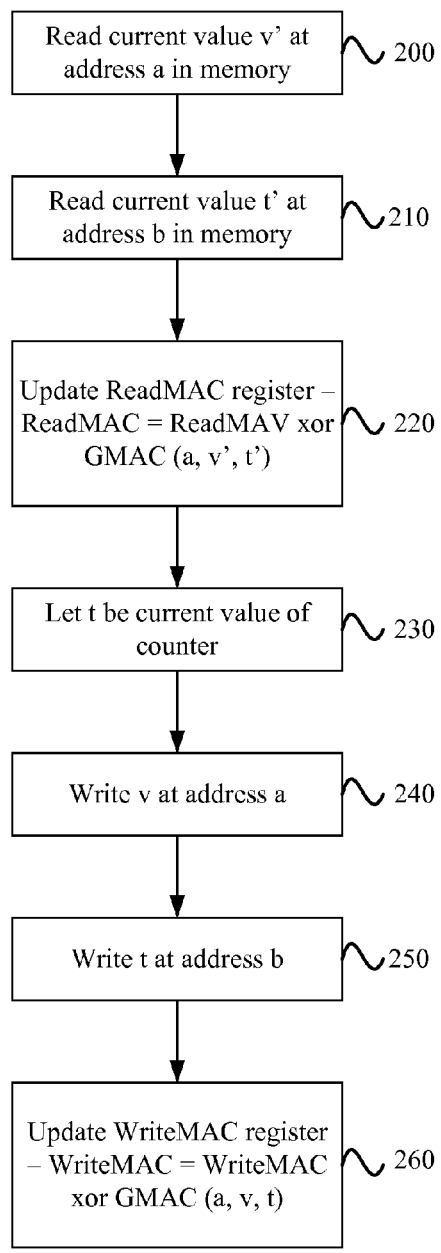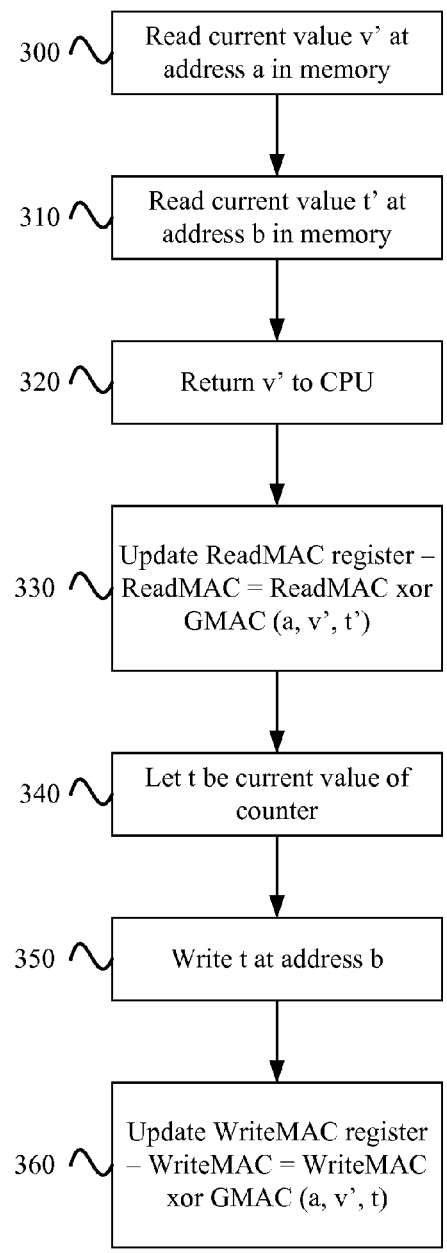
FIG. 2
FIG. 3

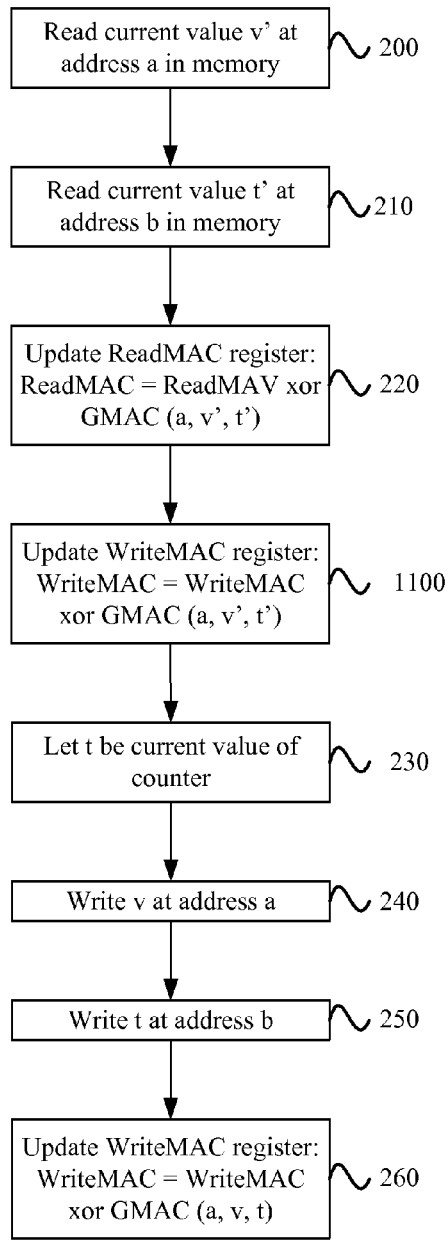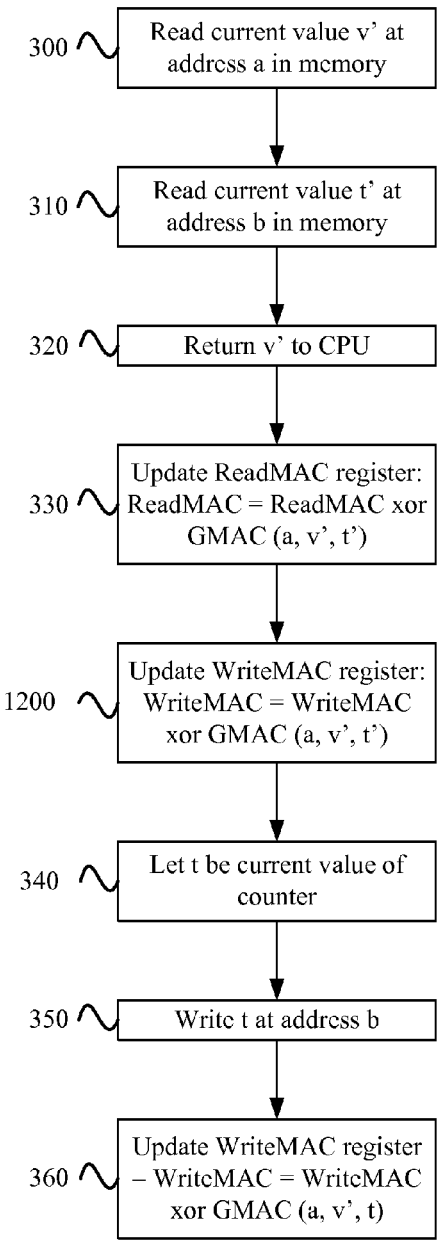
FIG. 11
FIG. 12

CUMULATIVE INTEGRITY CHECK VALUE (ICV) PROCESSOR BASED MEMORY CONTENT PROTECTION

BACKGROUND

Attackers may attempt to access memory of a computer system for any number of reasons including (1) obtaining confidential data (e.g., corporate trade secrets, personal identity data), (2) software piracy by uncovering secrets for licensing control of the software, (3) multimedia content breach (e.g. high-definition videos), and (4) modifying or injecting code/data to change program execution flow. Attackers may attempt to access the memory in any number of ways.

Attackers may perform a cold boot attack by pulling out physical memory of a computer system and scanning it using another machine to steal content (e.g., secrets, keys, files, content, identities) directly from memory. In order for processors to support trusted services, content protection and device authentication, it is essential for computer platforms to prevent cold boot attacks. Furthermore, as processors, for area and power efficiency, move the important microcode to memory, attacks on memory can fundamentally compromise the processor architecture, steal trade secrets and even inject malicious code at the micro-code level.

Attackers may also directly probe main memory or dynamic random access memory (DRAM) in a computer in order to discover sensitive and/or secret data stored in the main memory. In these hardware attacks, the hackers possess the hardware platform and the main memory (or DRAM) and may use sophisticated lab equipment (e.g., logic probes on the memory bus) to read the data out of the main memory (or DRAM).

Attackers may launch active attacks on memory by injecting code/data to the DRAM. The attackers may add malicious devices (e.g. field programmable gate arrays (FPGAs)) on a QuickPath Interconnect (QPI) bus to access memory directly.

Main memory is increasingly becoming non-volatile (e.g. Phase Change Memories and Flash) and even external, further increasing its susceptibility to attack. For example, network/back-plane memories allow DRAM to be shared by processors/blades across a data center, making man-in-the-middle attacks on the memory transactions as trivial as accessing a mirror port on a network switch.

In order to prevent the various attacks on memory requires encryption, integrity checking and anti-replay checking of the system's main memory. The mechanisms for ensuring confidentiality and providing high integrity memory, like error correcting codes for robust memory, require on-package/un-core memory cryptography circuits on, for example, a central processing unit (CPU). The cryptography circuits on the CPU may encrypt data at the CPU before the data are evicted from the CPU to the main memory. Thus, the memory stores the ciphertext of the data. Hackers attempting to access the data cannot uncover the plaintext of the data if they cannot subvert the underlying cryptographic schemes or the unique keys that may be fused into the CPU die at manufacture time.

In addition to data encryption, the cryptography circuits contained on the CPU may also generate a cryptographic integrity check value (ICV) over the data. Both the encrypted data and the ICVs may be stored in the main memory. When the CPU reads from the main memory, the CPU checks for ICV correctness prior to accepting the encrypted data. If the attackers use the active hardware manipulation to modify the data, the ICV check will fail and the CPU will detect data modification. If the memory were only encrypted, the attackers could change the bit pattern such that an unpredictable bit pattern is injected into the CPU cache (and may compromise the state of the machine).

Attackers may be able to capture encrypted data and the associated ICVs and replay these values, for example, to get around content that has restricted usage (e.g., movies that are allowed to be played only a certain number or times). Restricted usage content may store a value associated with usage at a location in memory. The value may be checked prior to allowing access to the content and then may be updated after the content is accessed (e.g., the movie played) and the new value may be stored at the location in memory. A hacker may capture a previous usage value from the memory and replay the value when the program attempts to access the usage value. If the attacker captures an old usage value that has the correct ICV and encryption they can use this old data to continuously access (e.g., play) the content.

Anti-replay mechanisms may be implemented to prevent this play-back attack. These anti-replay mechanisms may require computation and storage of a version tree or cryptographic hash tree that assures old memory contents cannot be replayed. These data structures amplify the read/write overheads by orders of magnitude significantly increasing memory latency and reducing throughput to main memory. Alternatively, the CPU may store all the ICV values inside the CPU package so that an attacker cannot access them. However, this solution may not be practical as it could require excessive CPU memory and multiple read/writes for every data access. For example, one ICV (e.g. 16-byte) may be stored for each cacheline in memory (e.g. 64-byte).

BRIEF DESCRIPTION OF THE DRAWINGS

The features and advantages of the various embodiments will become apparent from the following detailed description in which:

FIG. 2 illustrates an example process flow for updating cumulative ICVs when the CPU is writing data to memory, according to one embodiment;

FIG. 3 illustrates an example process flow for updating cumulative ICVs when the CPU is reading data from memory, according to one embodiment;

FIG. 11 illustrates an example process flow for updating cumulative ICVs when the CPU is writing data to memory with initialization, according to one embodiment; and FIG. 12 illustrates an example process flow for updating cumulative ICVs when the CPU is reading data from memory with initialization, according to one embodiment.

DETAILED DESCRIPTION

Generating integrity check values (ICV) for reads and writes made in the system and storing a cumulative ICV for the reads and the writes in the CPU may be utilized to provide the encryption, integrity checking and anti-replay checking of the system's main memory. The use of cumulative ICV registers within the CPU for encryption, integrity checking and anti-replay checking can be performed without the performance degradation caused by utilizing version trees or cryptographic hash trees or without excessive memory being required on the CPU to store ICV values for each cache line. The cumulative ICV may be generated by performing an exclusive OR (XOR) operation on a current ICV value (e.g., stored in a register on the CPU) and a new ICV value calculated for the memory access. An XOR function allows for mathematical accumulation of the ICVs.

At certain periods the memory may be checked by comparing the cumulative ICVs for the writes with the cumulative ICVs for the reads. The periods with which the cumulative ICVs are compared may be configurable, and may be based on one or more programs that the CPU is running. The period may be such that the data integrity is verified before the data stored in the cache of the CPU is flushed. Utilizing the cumulative ICVs (stored in registers on the CPU) does not detect a memory attack at the point it happened but rather detects it at some point in time before harm possibly caused by the attack on the data is propagated to the system.

Figure 1:
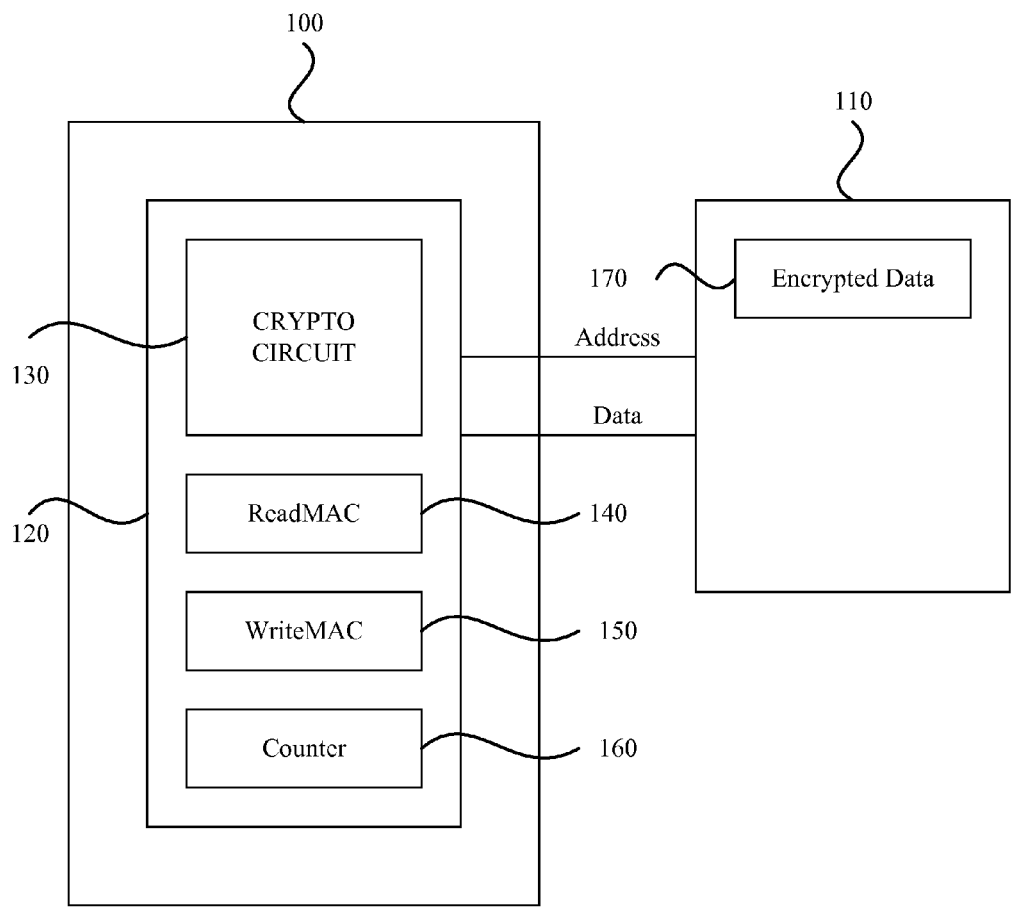
FIG. 1 illustrates a block diagram of example computer system implementing content protection utilizing cumulative ICV, according to one embodiment.

FIG. 1 illustrates a block diagram of an example computer system implementing content protection utilizing cumulative ICV that can be utilized to track history of integrity checks. The system includes a processor (e.g., CPU) 100 and main memory or dynamic random access memory (DRAM) 110. The CPU 100 includes a memory controller 120. The memory controller 120 includes a cryptographic circuit 130 and a plurality of registers (e.g., 3). The registers may include a cumulative read ICV (read message authentication code (ReadMAC)) register 140, a cumulative write ICV (WriteMAC) register 150, and a counter register 160. The memory (or DRAM) 110 may include an encrypted memory portion 170 for storing encrypted data. The memory controller 120 may communicate with (read data from or write data to) the memory 110 using an address bus and a data bus.

When the CPU 100 reads and writes data from and to the memory 110, the cryptographic circuit 130 may encrypt the data and generate a cryptographic integrity check value (ICV) over the data. The cryptographic circuit 130 may generate the ICVs by utilizing standard symmetry key-based MAC schemes (e.g., Galois MAC (GMAC), CBC-mode based MAC (CMAC), hash-based MAC (HMAC)). The GMAC scheme may be advantageous because it has high throughput (e.g., greater than GB/s). The cryptographic circuit 130 may be a high throughput and area efficient cryptographic circuit, such as an Advanced Equipment Standard Galois/Counter Mode (AES-GCM) cryptographic circuit. The cryptography key used for the MAC schemes may be burned into fuses on the CPU during production or could be created by a random number generator (or pseudorandom number generator) on the CPU. The ICV may be generated from the MAC scheme (e.g., GMAC) based on address (a), data (v), and counter (t) values, GMAC(a,v,t). Alternatively, the ICVs may be generated using other means, for example, using error correcting codes.

The ReadMAC register 140 and the WriteMAC register 150 may be fixed length for storing the ICV values. For example, the register may be 16-bytes as MAC schemes may typically output a 16-byte value. The ReadMAC register 140 and the WriteMAC register 150 enable the CPU 100 to accumulate the history of the data integrity of CPU reads and writes during program execution.

The counter register 160 may also be a fixed length register for storing a counter value. The counter may run under the CPU control, and its real-time values may be used for data integrity calculation. The counter value may simply be an incrementing value (e.g., based on memory access) or may be portioned into sections where one section is an unpredictable random number (possibly an encrypted random number) that is unpredictable to adversaries and another section is an incrementing value. The size of the register may be based on the number of memory accesses to be accumulated as well as the level of randomness to be utilized. For example, the counter register 160 could be a small as 1-byte or could be as large as 32-bytes.

The cryptographic circuit 130 may perform certain operations to generate and store the appropriate values in the appropriate registers, for example, when a write to memory, a read from memory, or a memory initialization are performed. Likewise, the cryptographic circuit 130 may perform certain functions when the CPU 100 desires to check the memory 110 for a specific address range. The CPU 100 may check the memory based on one or more programs that the CPU 100 is running, where the memory checks may be made before the program propagates the confidential data to the system where harm may possibly be caused if the confidential data was modified by an attack.

The system 100 may include a computer readable storage medium (not illustrated) storing computer executable instructions (e.g., programs) that when executed by the CPU 110 cause the CPU 110 to perform certain functions including reading and writing data to memory 120 and identifying confidential data and interfacing with the cryptographic circuit 130 to ensure the integrity of the confidential data.

FIG. 2 illustrates an example process flow for updating cumulative ICVs when the CPU 100 is writing data (e.g., data identified as confidential data) to memory 110. The write may consist of writing data v (e.g., CPU cacheline 64-byte data stream) to an address a in memory and writing a counter value t to an address b in memory. The address b may be dependent on the data v stored in address a or may be based on address a (e.g., follow address a).

The process may start with the CPU reading the current data value v' from address a in memory 200 and the current counter value t' from address b in memory 210. The address b may be dependent on data v' stored in address a or may simply be based on address a. The cryptographic circuit may generate an ICV for the CPU reads utilizing, for example, GMAC (a,v',t'). The cryptographic circuit may then XOR the current ReadMAC value from the ReadMAC register with GMAC(a, v',t') to create an updated ReadMAC and store the updated ReadMAC in the ReadMAC register 220.

A new counter value t may be assigned 230. As previously noted the counter may be purely incremental based on memory access or may include an unpredictable random number in addition to an incrementing value. The t may be stored in the counter register. The CPU may then write data value v to address a in memory 240 and counter value t to address b in memory 250. The cryptographic circuit may generate an ICV for the CPU writes utilizing GMAC(a,v,t) and then XOR the current WriteMAC value from the WriteMAC register with GMAC(a,v,t) to create an updated WriteMAC and store the updated WriteMAC in the WriteMAC register 260.

FIG. 3 illustrates an example process flow for updating cumulative ICVs when the CPU 100 is reading data from memory 110 (read data v from address a). The process may start with the CPU reading the current data value v' from address a in memory 300 and the current counter value t' from address b in memory 310. The current data value v' is provided to the CPU per the read request 320. The cryptographic circuit may generate an ICV for the CPU reads utilizing GMAC(a,v',t') and may then XOR the current ReadMAC value from the ReadMAC register with GMAC(a,v',t') to create an updated ReadMAC and store the updated ReadMAC in the ReadMAC register 330.

A new counter value t may be assigned and may be stored in the counter register 340. The CPU may then write counter value t to address b 350. The cryptographic circuit may generate an ICV for the CPU writes utilizing GMAC(a,v',t) and then XOR the current WriteMAC value from the WriteMAC register with GMAC(a,v',t) to create an updated WriteMAC and store the updated WriteMAC in the WriteMAC register 360. It should be noted that since only a new counter value was written that the GMAC utilized the current data value v' to generate the ICV.

Figure 4:
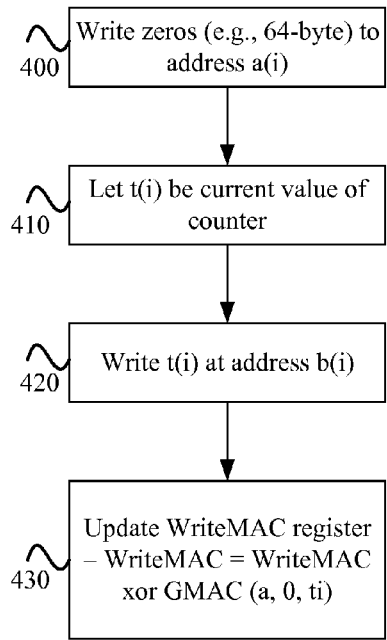
FIG. 4 illustrates an example process flow for updating cumulative ICVs when the CPU is initializing memory prior to program execution, according to one embodiment.

FIG. 4 illustrates an example process flow for updating cumulative ICVs when the CPU 100 is initializing memory 110 prior to program execution. Initially an address range is defined for the memory initialization. For each address a(i) within the address range, zeros are written to memory at location a(i) 400. If the memory location is 64-bytes (e.g., CPU cacheline) then 64 bytes of zeros are written thereto. A new counter value t(i) may be assigned 410 and t(i) may be written to address b(i) 420. The cryptographic circuit determinates GMAC(a,0,ti) and then XORs it with the current WriteMAC to create an updated WriteMAC that is stored in the WriteMAC register 430.

Figure 5:
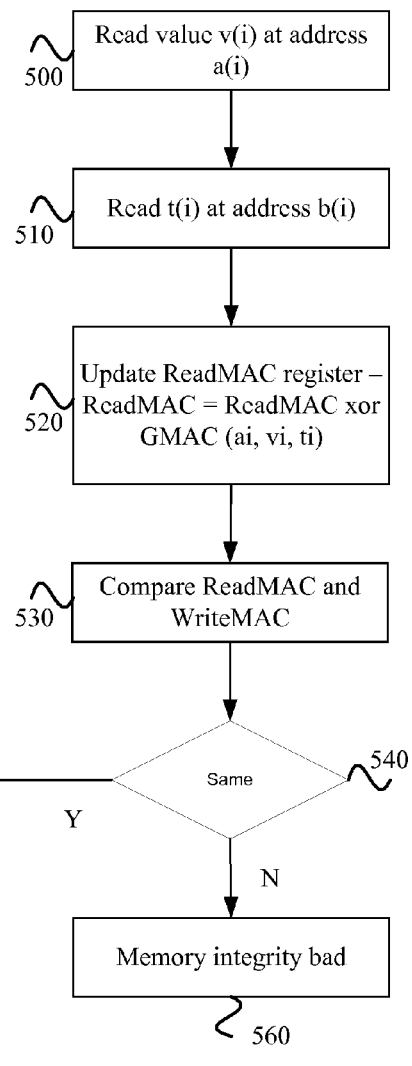
FIG. 5 illustrates an example process flow for updating cumulative ICVs when the CPU is checking memory, according to one embodiment.

FIG. 5 illustrates an example process flow for updating cumulative ICVs when the CPU 100 is checking memory 110. Initially an address range is defined for the memory checking. For each address a(i) within the address range, the data v(i) is read from address a(i) 500 and the counter t(i) is read from b(i) 510. The cryptographic circuit determinates GMAC(ai,vi,ti) and then XORs it with the current ReadMAC to create an updated ReadMAC that is stored in the ReadMAC register 520. The ReadMAC and the WriteMAC values are then compared 530 and a determination is made as to whether they are the same 540. If ReadMAC=WriteMAC (540 yes), the memory integrity is good 550 while if they do not match (540 no), the memory integrity is considered bad and the machine (CPU and platform) are halted to ensure the integrity is not compromised any further 560.

Figure 6A:
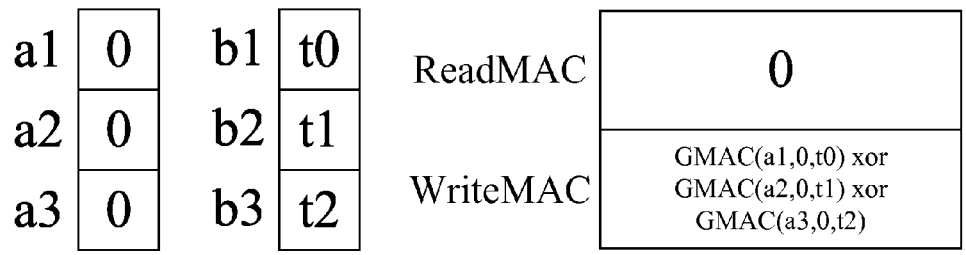
FIGS. 6A-H walk through some example interactions between the CPU and the memory and the ReadMAC and WriteMAC values generated for those interactions, according to one embodiment.

FIGS. 6A-H walk through some example interactions between the CPU and the memory and the ReadMAC and WriteMAC values generated for those interactions. The sample interactions entail reading and writing data to three memory locations a1-a3 and counters to three memory locations b1-b3. FIG. 6A illustrates the memory being initialized so that 0s are stored in each memory location a1-a3 and counters t0-t2 are stored in memory locations b1-b3. Following the process for memory initialization identified in FIG. 4, the WriteMAC stored in the WriteMAC register at the end of the initialization process will for be the GMAC generated for each of the writes of zeros to each memory location XORed together, such that WriteMAC=GMAC(a1,0,t0) XOR GMAC(a2,0,t1) XOR GMAC(a3,0,t2) and there will be no ReadMAC.

Figure 6B:
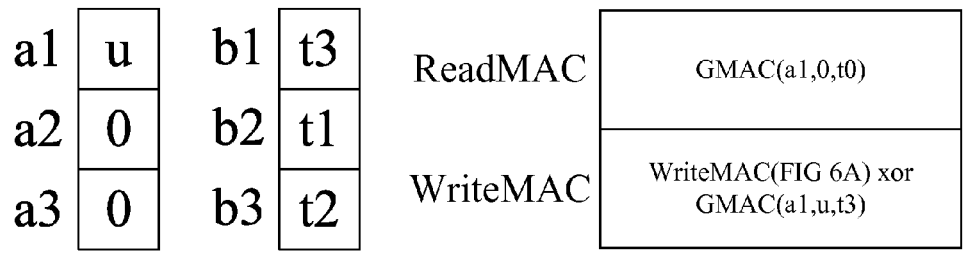

FIG. 6B illustrates writing u to a1 and writing t3 (next counter) to b1. Following the process for writes identified in FIG. 2, the ReadMAC is updated by XORing the current ReadMAC with the GMAC(a1,0,t0) for the previous data (0) from the address a1 and the previous counter (t0) associated therewith. Since there was no previous ReadMAC the current ReadMAC is GMAC(a1,0,t0). The WriteMAC is updated by XORing the current WriteMAC indentified in FIG. 6A with the GMAC(a1,u,t3) for the data (u) written to address a1 and the counter (t3) written to address b1.

Figure 6C:
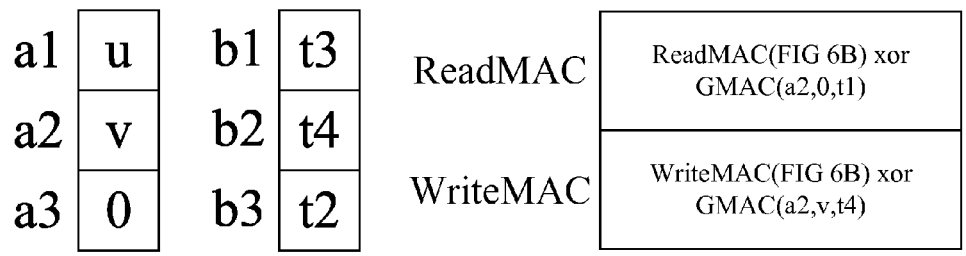

FIG. 6C illustrates writing v to a2 and t4 (next counter) to b2. The ReadMAC is updated by XORing the current ReadMAC from FIG. 6B with the GMAC(a2,0,t1). The WriteMAC is updated by XORing the current WriteMAC from FIG. 6B with the GMAC(a2,v,t4).

Figure 6D:
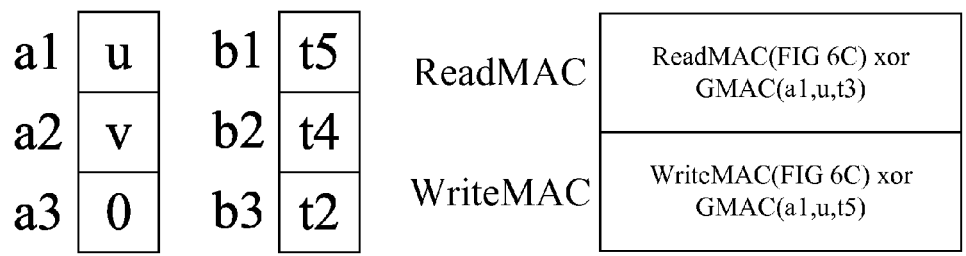

FIG. 6D illustrates reading data from a1 and writing t5 (next counter) to b1. Following the process for reads identified in FIG. 3, the ReadMAC is updated by XORing the current ReadMAC from FIG. 6C with the GMAC(a1,u,t3) for the data (u) from the address a1 and the previous counter (t3) associated therewith. The WriteMAC is updated by XORing the current WriteMAC indentified in FIG. 6C with the GMAC (a1,u,t5) for the data (u) read from a/and the new counter (t5) written to address b1.

Figure 6E:
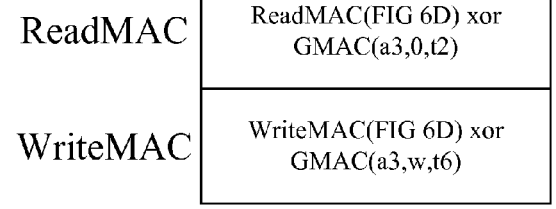

FIG. 6E illustrates writing w to a3 and t6 (next counter) to b3. The ReadMAC is updated by XORing the current ReadMAC from FIG. 6D with the GMAC(a3,0,t2). The WriteMAC is updated by XORing the current WriteMAC from FIG. 6D with the GMAC(a3,w,t6).

Figure 6F:
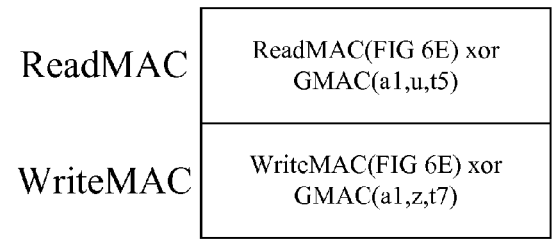

FIG. 6F illustrates writing z to a1 and t7 (next counter) to b1. The ReadMAC is updated by XORing the current ReadMAC from FIG. 6E with the GMAC(a1,u,t5). The WriteMAC is updated by XORing the current WriteMAC from FIG. 6E with the GMAC(a3,z,t7).

Figure 6G:
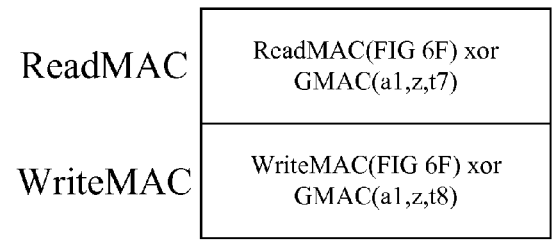

FIG. 6G illustrates reading data from a1 and writing t8 (next counter) to b1. The ReadMAC is updated by XORing the current ReadMAC from FIG. 6F with the GMAC(a1,z,t7). The WriteMAC is updated by XORing the current WriteMAC indentified in FIG. 6F with the GMAC(a1,z,t8).

Figure 6H:
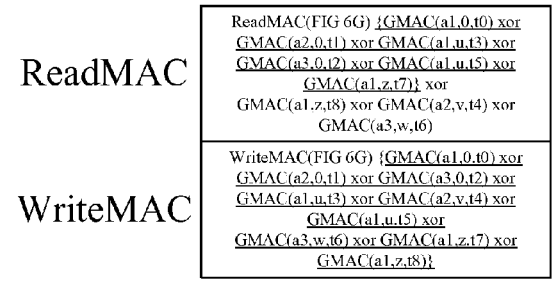

FIG. 6H illustrates checking the memory for addresses a1-a3. Following the process for memory checking identified in FIG. 5, the ReadMAC is updated by XORing the current ReadMAC value from FIG. 6F with the GMAC(ai,vi,ti) based on the data (vi) read from each memory address (ai) and the counter (ti) read from each corresponding memory address (bi) for the memory locations being verified (locations a1-a3). In the this case, the updated ReadMAC=ReadMAC(FIG. 6F) XOR GMAC(a1,z,t8) XOR GMAC(a2,v,t4) XOR GMAC (a3,w,t6). After the updated ReadMAC is generated it is compared to the current WriteMAC. The various GMACs that were XORed to create the previous ReadMAC and WriteMAC are illustrated within brackets { } and underlined. A comparison shows that the ReadMAC and the WriteMAC are equal. It should be noted that the GMACs are not in the same order for the ReadMAC and the WriteMAC but that is not required as the XOR operation is commutative (e.g., x XOR y=y XOR x).

The above example had the memory being integrity checked as the $8^{th}$ action. It should be noted that this was simply an example. The periods at which the memory may be integrity checked may be fixed, may be variable or may be configurable. The periods may vary on the programs running. The period may be such that the data integrity is verified before the data stored in the cache of the CPU is flushed. As the memory accesses may continue while the memory is being integrity checked the integrity check may start at least a predefined period before the program would propagate the contents of the memory to ensure any potential memory integrity breaches could be identified and the system halted before the attacked data was propagated and possibly causing system harm.

Figure 7A:
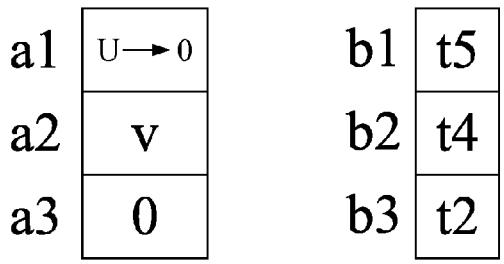
FIGS. 7A-7B illustrate some example attacks being detected utilizing the cumulative ICVs stored in the WriteMAC and ReadMAC registers, according to one embodiment.
Figure 7B:
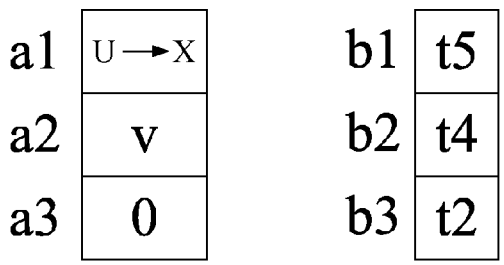

FIGS. 7A-7B illustrate some example hardware attacks being detected utilizing the cumulative write and read ICVs stored in the WriteMAC and ReadMAC registers respectively. FIG. 7A illustrates a replay attack occurring at the read request of address a1 previously described in FIG. 6D. It is assumed that the attacker captured the previous value (0) recorded at address a1 (written to a1 in FIG. 6A) and that during this read operation replays the previous value to the CPU. FIG. 7A illustrates the replay attack as the v at address a1 being replaced with 0. The updated ReadMAC will include GMAC(a1,0,t3) as opposed to the GMAC(a1,u,t3) that was recorded in the WriteMAC when u was written to a1 in FIG. 6B. Accordingly, when a comparison is performed the WriteMAC and the ReadMAC will not match and the data integrity will be flagged as being bad and the system will halt.

FIG. 7B illustrates an attacker changing the data that is stored in memory locational and the counter stored at location b1 prior to the read of address a1 previously described in FIG. 6D. Assume that the attacker manipulates the v stored at address a1 with X and the t3 stored at b1 with t99. Similar to the replay attacked described above, the updated ReadMAC will not include GMAC(a1,u,t3) that was recorded in the WriteMAC in FIG. 6B. Furthermore, the WriteMAC will not be able to cancel GMAC(a1,X,t99) captured in the ReadMAC as WriteMAC will include GMAC(a1,X,t5) and t5 is controlled by the CPU.

The use of the WriteMAC and ReadMAC registers may also be used to capture attacks that swap the order of memory reads. Referring back to FIGS. 6A-H, data is written to address a1 in FIGS. 6B and 6F and the data is read from a1 in FIGS. 6D and 6G. In FIG. 6D the system is supposed to read u from a1 and in FIG. 6G the system is supposed to read z from a1. If the attacker knew when the data was supposed to be read and what the data to be read was, they could potentially switch the order in which the data was read by the CPU (e.g., read z in FIG. 6D and u in FIG. 6G). The values, XORed in WriteMAC register when the data where written thereto in FIGS. 6B and 6F include GMAC(a1, u, t3) and GMAC(a1, z, t7). The values, XORed in ReadMAC register when the data are read in the swapped order from the attacker in FIGS. 6D and 6G include GMAC(a1, z, y0) and GMAC(a1, u, y1) where y0 and y1 may be controlled by the hacker. However, at the point that z is read from memory (FIG. 6D) it has not yet been written (FIG. 6F) so the hacker will not know what the value of t7. Accordingly, it is highly unlikely that the attacker could pick a value of y0=t7, especially if the counter value includes random numbers. Therefore, the ReadMAC and WriteMAC will not match when the memory is checked and this type of memory attack will also be detected.

While the CPU is performing the memory reads necessary for integrity checking, the CPU should be free to continue performing any reads/writes that are required by the program (or programs) running thereon to ensure the pipeline of the CPU execution is not stalled by the memory integrity checking. As previously noted, the program being run by the CPU may determine that integrity checking is required at certain intervals and instruct the cryptographic circuit validate the integrity.

Figure 8:
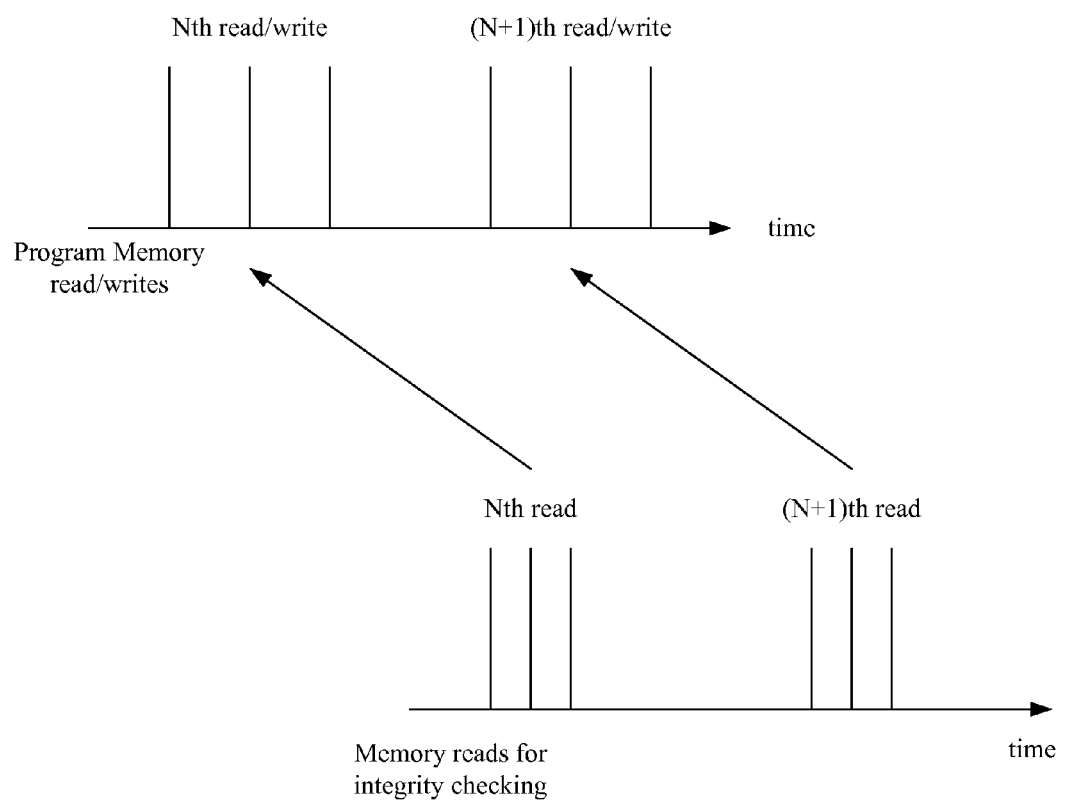
FIG. 8 illustrates an example timing diagram associated with program reads/writes and the memory reads for memory integrity checking, according to one embodiment.

FIG. 8 illustrates an example timing diagram associated with program reads/writes and the memory reads for memory integrity checking. The memory reads required for memory integrity checking associated with an Nth run of a program may overlap with memory reads/writes for a next (N+1)th run of the program(s). It is possible that memory writes for the (N+1)th run may overwrite the values that are required for the memory check of N-th run.

Figure 9:
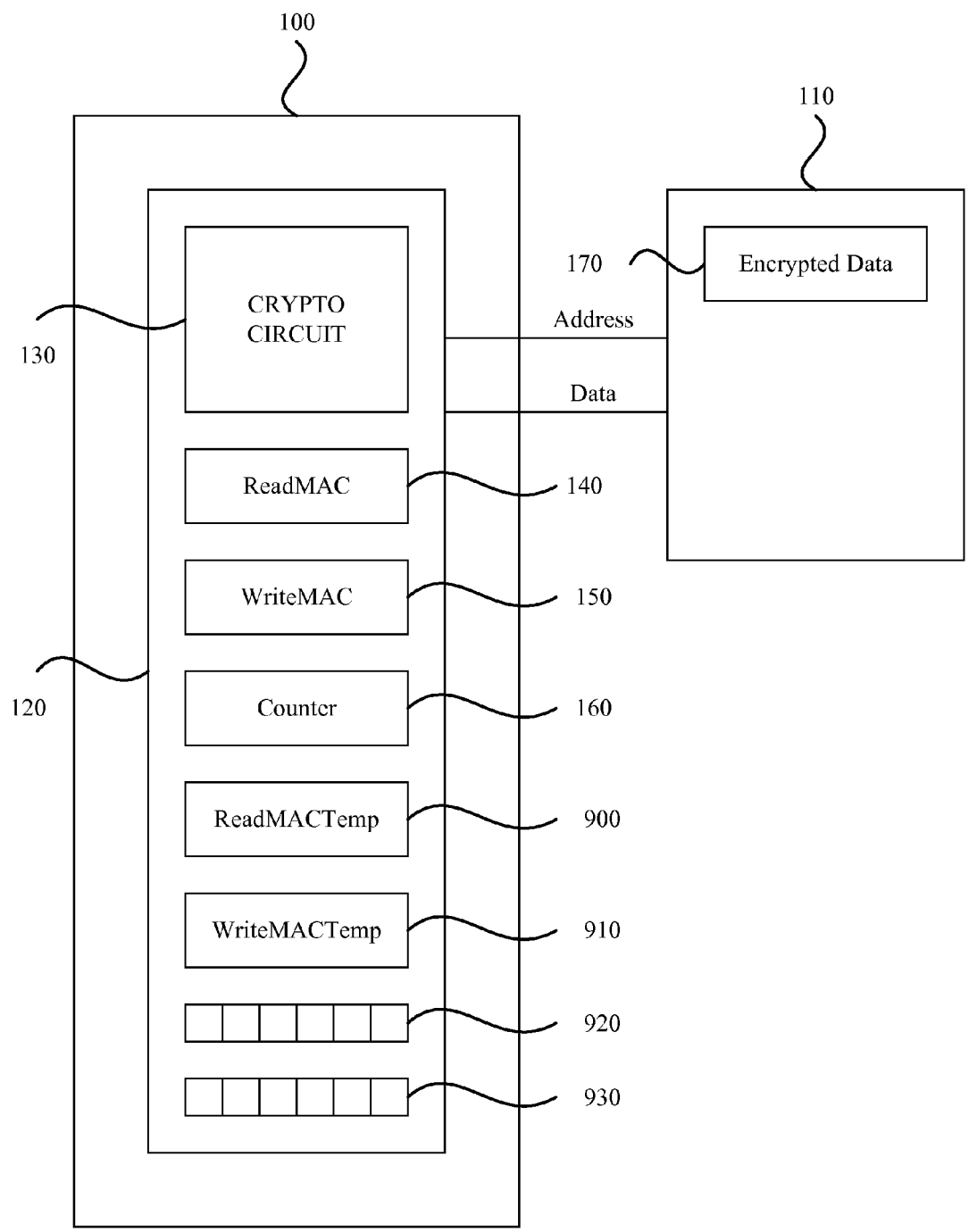
FIG. 9 illustrates a block diagram of an example computer system implementing content protection utilizing cumulative ICVs that can handle the overlap in reads/writes associated with program runs and the reads associated with memory integrity validation, according to one embodiment.

FIG. 9 illustrates a block diagram of an example computer system implementing content protection utilizing cumulative ICV that can handle the overlap in reads/writes associated with program execution and the reads associated with memory integrity validation. The system is similar to that described above with respect to FIG. 1. The memory controller 120 may further include two additional registers for temporarily storing the cumulative ICVs for the read and writes to memory (ReadMACTemp 900, WriteMACTemp 910). The memory controller 120 may also include bitmaps for tracking various information about memory locations. For example, one bitmap (AddressSeen) 920 may track the memory locations that were accessed during a previous program run (N). Another bitmap (FirstSeen) 930 may track the memory locations previously seen that are in the current program run (N+1).

Figure 10:
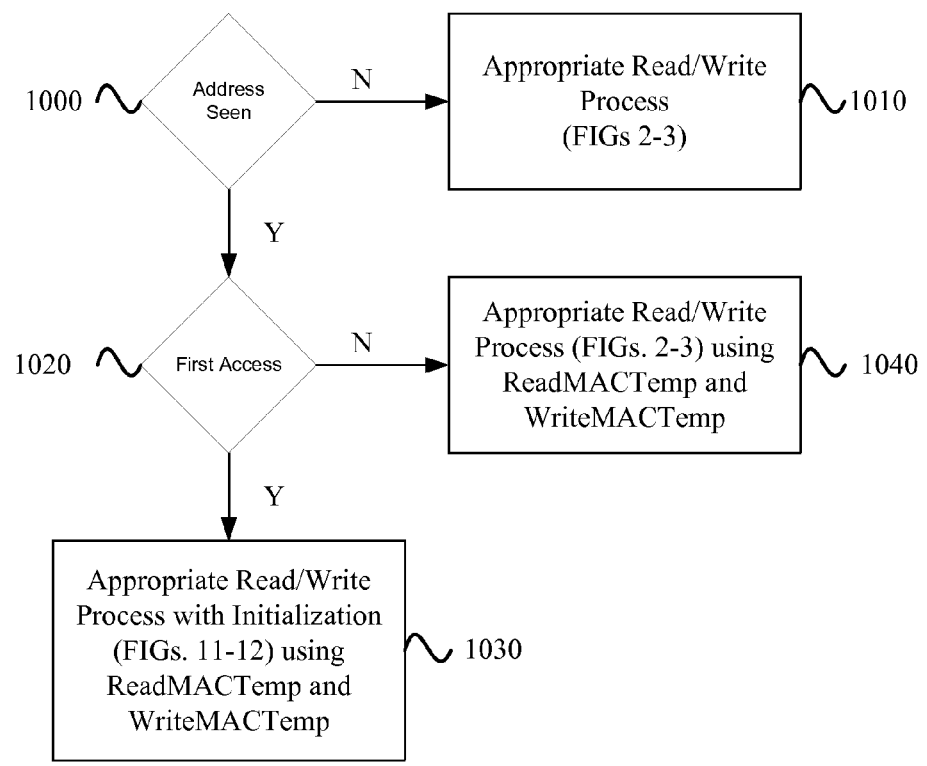
FIG. 10 illustrates an example process flow for determining how to proceed if there is overlapping program read/writes and memory integrity reads, according to one embodiment.

FIG. 10 illustrates an example process flow for determining how to proceed if there is overlapping program read/writes and memory integrity reads. Initially during a program run (N+1), a determination is made as to whether the address was accessed during the previous program run (N) by checking to see if the associated bit in the AddressSeen bitmap is set (e.g., to 1) 1000. If the bit was not set (1000 No) indicating that the address was not accessed in the previous program run, a read or write at that address will be processed according to the respective read or write process previously discussed with respect to FIG. 2 or 3 1010. If the bit was set (1000 Yes) indicating that the address was accessed in the previous program run, a determination will be made as to whether this is the first time this address has been accessed this program run by checking to see if the associated bit in the FirstAcess bitmap is set (e.g., to 1) 1020.

If the bit was not, set indicating that this is the first time the address has been accessed this program run (1020 Yes), a read or write at that address will be processed according to the respective read or write process with initialization that will be discussed with respect to FIG. 11 or 12 utilizing the ReadMACTemp and WriteMACTemp registers 1030. If the bit was set, indicating that the address was accessed previously in this program run (1020 No), a read or write at that address will be processed according to the respective read or write process previously discussed with respect to FIG. 2 or 3 but utilizing the ReadMACTemp and WriteMACTemp registers 1040.

FIG. 11 illustrates an example process flow for updating cumulative ICVs when the CPU is writing data to memory with initialization. The process is similar to the process described above in FIG. 2 with the addition of an additional update WriteMAC step 1100 that initializes the WriteMACTemp register with a GMAC(a,v',t') based on the data v' read from memory location a and the counter t' read from memory location b.

FIG. 12 illustrates an example process flow for updating cumulative ICVs when the CPU is reading data from memory with initialization. The process is similar to the process described above in FIG. 3 with the addition of an additional update WriteMAC step 1200 that initializes the WriteMACTemp register with a GMAC(a,v',t') based on the data v' read from memory location a and the counter t' read from memory location b.

Once the memory integrity reads for a program run (N) are complete, the cumulative read and write MACs stored in the ReadMACTemp and WriteMACTemp registers for the N+1 run may be XORed with the cumulative read and write MACs stored in the ReadMAC and WriteMAC registers and the result stored in the ReadMAC and WriteMAC registers. XORing the registers will add the cumulative MACs from the N+1 program run to the overall cumulative MACs. The ReadMACTemp and WriteMACTemp registers may then be cleared (e.g., contents zeroed out). The contents of the AddressSeen and FirstSeen bitmaps may also be reset after the memory integrity reads for a program run (N) are complete.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable storage medium providing program code for use by or in connection with a computer or any instruction execution system. For example, a computer-usable or computer-readable medium may be or may include any apparatus that can contain or store the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A processor comprising:
a circuit based cryptographic engine to encrypt data to be written to memory, to decrypt data read from memory, to generate read message authentication codes (MACs) and write MACs for read and write memory accesses, to create a cumulative read MAC and a cumulative write MAC by XORing the generated read MAC and the generated write MAC with a current read MAC and a current write MAC respectively, and to validate data integrity by comparing the cumulative read MAC and the cumulative write MAC, wherein for write operations to a memory address the cryptographic engine is to generate the read MAC based on current data stored at the memory address and a currently stored counter value associated with the memory address and the write MAC based on data written to the memory address and a new counter value associated with the write to the memory address, and wherein for read operations to a memory address the cryptographic engine is to generate the read MAC based on current data stored at the memory address and the currently stored counter value associated with the memory address and the write MAC based on current data stored at the memory address and the new counter value associated with the read from the memory address;
a register to store the cumulative read MAC;
a register to store the cumulative write MAC; and
a register to maintain a counter value for memory accesses, wherein the new counter value includes an unpredictable randomly generated portion.

2. The processor of claim 1, wherein the cryptographic engine is a high-performance symmetric-key based MAC cryptographic engine.

3. The processor of claim 1, wherein the cryptographic engine is to generate the read MACs and the write MACs based on memory address, data, and the counter value associated with the memory access.

4. The processor of claim 1, further comprising
a register to temporarily store the cumulative read MAC; and
a register to temporarily store the cumulative write MAC, wherein the temporary storage registers are used when memory integrity validation operations are occurring concurrently with normal memory reads and writes.

5. The processor of claim 4, further comprising a first bitmap to track memory addresses associated with the memory integrity validation operations.

6. The processor of claim 5, further comprising a second bitmap to track memory addresses associated with the memory integrity validation operations that are accessed for a first time.

7. The processor of claim 6, wherein for memory addresses being accessed the first time, the cryptographic engine is to generate a write MAC based on current data stored at the memory address and the currently stored counter value associated with the memory address.

8. The processor of claim 7, wherein
for write operations to the memory address being accessed the first time, the cryptographic engine is further to generate the read MAC based on current data stored at the memory address and the currently stored counter value associated with the memory address and the write MAC based on data written to the memory address and a new counter value associated with the write to the memory address; and for read operations to the memory address being accessed the first time, the cryptographic engine is further to generate the read MAC based on current data stored at the memory address and the currently stored counter value associated with the memory address and the write MAC based on current data stored at the memory address and a new counter value associated with the read from the memory address.

9. A system comprising:
a processor including a cryptographic engine, a first register, a second register, and a third register;
memory, including an encrypted portion; and
a processor readable storage medium storing processor executable instructions that when executed by the processor causes the processor to write data to the memory and read data from the memory, to identify confidential data requiring encryption, integrity checking and anti-replay checking, to determine when data integrity of the confidential data should be validated, and to maintain a memory access counter value in the third register, wherein the memory access counter value includes a randomly generated portion;
wherein the cryptographic engine is configured to encrypt the confidential data to be written to the memory by the processor, to decrypt encrypted data read by the processor from the memory, to generate read integrity check values (ICVs) and write ICVs for memory accesses by the processor, to XOR the generated read ICV and the generated write ICV with a current read ICV and a current write ICV respectively to create a cumulative read ICV and a cumulative write ICV, to write the cumulative read ICV to the first register and the cumulative write ICV to the second register, and to validate data integrity by comparing the cumulative read ICV and the cumulative write ICV, wherein the cryptographic engine utilizes the memory access counter value associated with a particular memory access to generate the read ICVs and the write ICVs.

10. The system of claim 9, wherein the cryptographic engine is a high-performance symmetric-key based message authentication code (MAC) cryptographic engine.

11. The system of claim 9, wherein the cryptographic engine is to generate the read ICVs and the write ICVs as message authentication codes (MACs) based on memory address, data, and the memory access counter value associated with the memory access.

12. The system of claim 9, wherein the memory access counter value is written to the memory for each memory access.

13. The system of claim 12, wherein an address in the memory that the memory access counter value is written to is based on an address in the memory where corresponding data is stored.

14. The system of claim 9, wherein the processor further includes
a first bitmap to track memory addresses associated with memory integrity validation operations of a Nth run of memory accesses;
a fourth register to temporarily store the cumulative read ICV for the memory addresses noted in the first bitmap for a (N+1)th run of memory accesses occurring concurrently with the Nth run of the memory integrity validation operations; and
a fifth register to temporarily store the cumulative write ICV for the memory addresses noted in the first bitmap for the (N+1)th run of memory accesses occurring concurrently with the Nth run of the memory integrity validation operations.

15. The system of claim 14, wherein the processor further includes a second bitmap to track memory addresses noted in the first bitmap that are accessed for a first time during the (N+1)th run of memory accesses, and wherein the cryptographic engine is to generate a write ICV based on current data stored at the memory address and currently stored counter value associated with the memory address for memory addresses noted in the second bitmap as being accessed the first time prior to performing generating the read and write ICVs associated with the memory access.

16. A computer implemented method comprising:
generating a memory access counter for memory accesses to memory, wherein the memory access counter includes a randomly generated portion and an incremental portion;
encrypting, using an encryption engine, confidential data to be written to the memory;
writing the encrypted data to a first address in the memory;
writing the memory access counter associated with the encrypted data being written to the first address to a second address in the memory;
generating, using the encryption engine, a read message authentication code (MAC) for the encrypted data being written to the first address based on the first address, previous encrypted data stored in the first address, and previous memory access counter stored in the second address;
generating, using the encryption engine, a write MAC for the encrypted data being written to the first address based on the first address, encrypted data being written to the first address, and memory access counter being written to the second address;
reading the encrypted data from a third address in the memory;
writing the memory access counter associated with the encrypted data being read from the third address to a fourth address in the memory;
generating, using the encryption engine, a read MAC for the encrypted data being read from the third address based on the third address, encrypted data stored in the third address, and previous memory access counter stored in the fourth address;
generating, using the encryption engine, a write MAC for the encrypted data being read from the third address based on the third address, encrypted data stored in the third address, and memory access counter being written to the fourth address;
XORing the read MAC generated with a previous cumulative read MAC to create a current cumulative read MAC;
XORing the write MAC generated with a previous cumulative write MAC to create a current cumulative write MAC; and
at defined periods of time, validating integrity of data stored in the memory by comparing the current cumulative read MAC and the current cumulative write MAC.

17. The method of claim 16, wherein the generating read and write MACs for the encrypted data being written to the first address and read from the third address is performed using a high-performance symmetric-key based MAC cryptographic engine.

18. The method of claim 16, wherein the writing the memory access counter to the second and fourth addresses in memory includes selecting the second and fourth addresses based on data written to the first address and read from the third address respectively.

19. The method of claim 16, further comprising storing the current cumulative read MAC and the current cumulative write MAC in first and second registers respectively.

20. The method of claim 19, further comprising
tracking memory addresses associated with memory integrity validation operations of a Nth run of memory accesses; and
temporarily storing the current cumulative read MAC and the current cumulative write MAC in third and fourth registers respectively for a (N+1)th run of memory accesses occurring concurrently with the Nth run of the memory integrity validation operations.

* * * * *